Oct. 31, 1950  J. D. DANFORTH  2,527,709
CONDENSATION OF VINYL ESTERS AND ALIPHATIC AMINES
Filed March 12, 1947
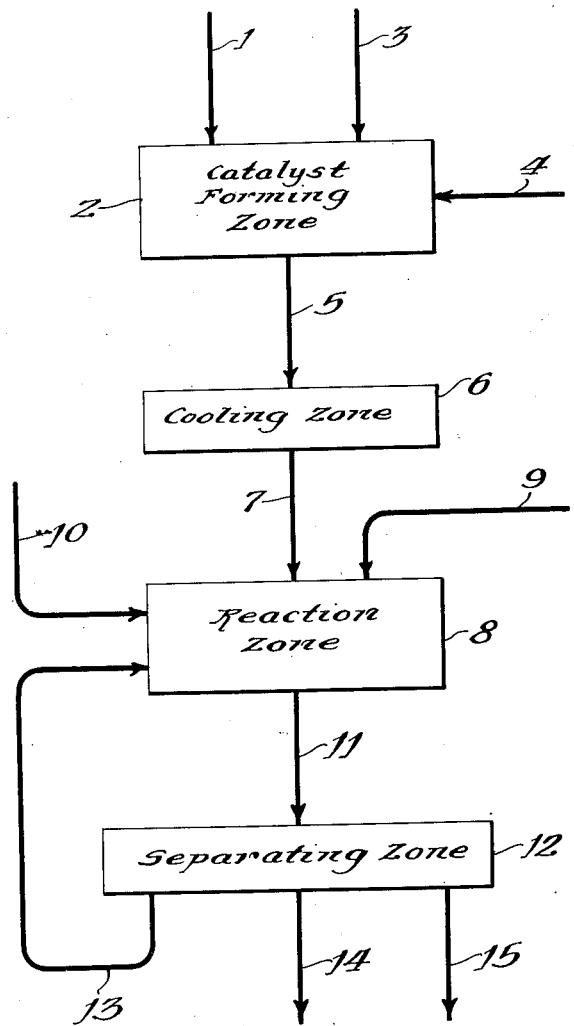
INVENTOR.
Joseph D. Danforth
BY
Maynard P. Venema
Attorney Patented Oct. 31, 1950

2,527,709

UNITED STATES PATENT OFFICE 2,527,709

CONDENSATION OF VINYL ESTERS AND ALIPHATIC AMINES

Joseph D. Danforth, Downers Grove, Ill., assignor to Universal Oil Products Company, Chicago, Ill., a corporation of Delaware Application March 12, 1947, Serial No. 734,252

16 Claims. (Cl. 260—490)

1

This application is a continuation-in-part of my copending application Serial Number 560,707 filed October 27, 1944, now abandoned.

This invention relates to the condensation of vinyl esters and aliphatic amines selected from the group consisting of monoalkyl amines and dialkyl amines.

An object of this invention is to prepare a condensation product with the general formula

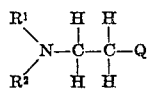

wherein $R^1$ represents a member of the group consisting of an alkyl group and a hydrogen atom, $R^2$ represents an alkyl group, and Q represents the anion of an acid.

Another object of this invention relates to the preparation of an alkali amine condensation catalyst.

One embodiment of this invention relates to a condensation process which comprises reacting an aliphatic amine selected from the group consisting of a monoalkyl amine and a dialkyl amine and minor proportions of an alkali metal and of a conjugated diolefin at a temperature above the melting point of said alkali metal for a time sufficient to form a reaction mixture containing an alkali metal amine and substantially free from unconverted alkali metal; cooling said reaction mixture to a temperature lower than the melting point of said alkali metal; and reacting the cooled reaction mixture with a vinyl ester of the formula $CH_2=CH-Q$ wherein Q represents the anion of an acid to form a condensation product of said aliphatic amine and vinyl ester.

Another embodiment of this invention relates to a condensation process which comprises reacting an aliphatic amine selected from the group consisting of a monoalkyl amine and a dialkyl amine, an alkali metal, and a conjugated diolefin at a temperature above the melting point of said alkali metal for a time sufficient to form a reaction mixture containing an alkali metal amine and substantially free from unconverted alkali metal; cooling said reaction mixture to a temperature lower than the melting point of said alkali metal; and reacting the cooled reaction mixture with an aliphatic amine selected from the group consisting of a monoalkyl amine and a dialkyl amine, and a vinyl ester with the formula $CH_2=CH-Q$ wherein Q represents the anion of an acid to form a condensation product.

2

A further embodiment of this invention relates to a condensation process which comprises reacting an aliphatic amine selected from the group consisting of a monoalkyl amine and a dialkyl amine, and minor proportions of an alkali metal and a conjugated diolefin at a temperature above the melting point of said alkali metal for a time sufficient to form a reaction mixture containing an alkali metal amine and substantially free from unconverted alkali metal; cooling said reaction mixture to a temperature lower than the melting point of said alkali metal; and reacting the cooled reaction mixture with an aliphatic amine selected from the group consisting of a monoalkyl amine and a dialkyl amine, and a vinyl ester with the formula $CH_2=CH-Q$ wherein Q represents the anion of an acid to form a condensation product.

According to the process of this invention, a compound with the general formula

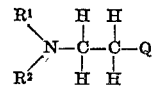

is formed by condensing a member of the group consisting of a monoalkyl amine and a dialkyl amine with a vinyl ester of an acid in the presence of a catalyst comprising essentially an alkali metal amine. In the above indicated formula, Q represents the anion of an acid. The acid of which Q is the anion may be either an organic acid such as a monocarboxylic acid sometimes referred to as an alkanoic acid or it may also be a mineral acid, particularly a hydrogen halide.

In carrying out this process, the catalyst is formed by reacting an aliphatic amine selected from the group consisting of a monoalkyl amine and a dialkyl amine with a minor proportion of an alkali metal and of a conjugated diolefin at a temperature above the melting point of the alkali metal. Thus a monoalkyl amine or a dialkyl amine reacts rapidly with sodium in the presence of 1,3-butadiene or another conjugated diolefin at a temperature above the melting point of sodium, namely 97.5° C. and preferably at a temperature of from 97.5° to about 150° C. to form what may be regarded as the sodium salt of the amine and to convert a portion of the added butadiene into butylene. For example, when the sodium amine is prepared from dipropylamine, this metal is added to a molar excess of the dipropylamine and the reaction mixture is then heated to a temperature of between about 100° and about 150° C. After the sodium has become molten, the reaction mixture is stirred vigorously and gaseous 1,3-butadiene is bubbled slowly into the reaction mixture. Reaction occurs rapidly and the alkali metal amine is formed according to the following equation which illustrates the formation of sodium dipropylamine:

$$2(C_3H_7)_2NH + 2Na + C_4H_6 \rightarrow C_4H_8 + 2(C_3H_7)_2NNa$$

The products of this reaction containing the alkali metal monoalkyl or dialkyl amine in admixture with the excess of the monoalkyl or dialkyl amine are cooled to a temperature below the melting point of the alkali metal and used directly as catalyst for the condensation of a vinyl ester with the aliphatic amine. The solution of the alkali metal amine in the excess of monoalkyl amine or dialkyl amine may also be cooled and the excess of unconverted amine may then be decanted from the solid alkali metal amine which is then employed as catalyst for the condensation of another monoalkyl or dialkyl amine with a vinyl ester. However, in order to avoid contamination of the final reaction products, the catalyst employed in most cases is a sodium or potassium derivative of the particular amine which is to be reacted with a vinyl ester.

In an alternative preparation of the catalyst in situ, the alkali metal is added to the monoalkyl or dialkyl amine preheated to a temperature above the melting point of the alkali metal, and the mixture is stirred. When the molten alkali metal is thoroughly dispersed in the amine as by means of a turbomixer or other suitable stirring device, a relatively small charge of a conjugated diolefin such as 1,3-butadiene (at least 0.5 mole per mole of alkali metal present and preferably one molecular proportion of diolefin per mole of alkali metal present in order to insure complete conversion of the alkali metal) is added slowly to the mixture. The reaction takes place as shown in the above equation forming an alkali metal amine in situ, after which the temperature of the reaction mixture is lowered and the ester containing a vinyl group is added to bring about the desired condensation to form an amine containing as substituent a —CH₂—CH₂—Q group wherein Q represents the anion of an acid.

After the alkali metal amine catalyst is prepared at a temperature above the melting point of the alkali metal, the condensation of a monoalkyl amine or dialkyl amine with an ester having a vinyl group combined chemically with the anion of an acid is carried out at a temperature of from about 0° to about 97.5° C., when sodium is the alkali metal, and preferably at a temperature of from about 25° to about 75° C. and at a pressure sufficient to keep the reaction mixture in substantially liquid phase. In general, the time of reaction and operating conditions needed to effect the desired condensation reaction is dependent upon the nature of the catalyst and of the vinyl ester and monoalkyl amine or dialkyl amine charged to the process. When reacting monoalkyl and dialkyl amines with vinyl esters, it is generally necessary to cool the reaction mixture in order to remove the exothermic heat of the reaction at a rate sufficient to permit control of the reaction temperature.

The advantages of the present method of preforming the solution of the alkali metal salt of the amine are clearly illustrated by the following considerations. Vinyl esters of acids such as monocarboxylic acids and hydrohalic acids are quite reactive with alkali metals such as potassium and sodium to give a "splitting reaction" in which the ester is saponified with the formation of the sodium salt of the acid. This undesirable side reaction is particularly evident at temperature conditions in which the alkali metal is in the molten state. The catalyst for the addition of amines to vinyl esters is not the alkali metal, but is the reaction product of the alkali metal with the amine. For the rapid formation of the catalyst, temperatures in the range of the melting point of the alkali metal are necessary, and the presence of the vinyl ester under these conditions gives rise to a large quantity of the undesirable products obtained in the splitting of the ester by the metal. By preforming the catalyst at the high temperature by the use of the conjugated diolefin as a hydrogen acceptor, and subsequently carrying out the reaction at lower temperatures in the substantial absence of metallic sodium (or potassium) a rapid controlled reaction gives good yields of the desired product with only negligible quantities of by-products.

The process of this invention is illustrated further by the attached diagrammatic drawing which shows a flow diagram of one method by which the process is carried out.

An aliphatic amine selected from the group consisting of a monoalkyl amine and a dialkyl amine is introduced through line 1 to catalyst forming zone 2 to which an alkali metal is introduced by way of line 3. The alkali metal particularly sodium or potassium may be melted before being introduced to zone 2 or it may be added in finely divided form or by other means such as extrusion. The resultant mixture of aliphatic amine and alkali metal is heated in zone 2 to a temperature above the melting point of the alkali metal and then a conjugated diolefinic hydrocarbon such as 1,3-butadiene is introduced to catalyst forming zone 2 by way of line 4. Interaction of the aliphatic amine with the alkali metal such as sodium is relatively slow in zone 2 before the diolefinic hydrocarbon is introduced thereto, but upon introducing the diolefin either intermittently or continuously there is a rapid formation of alkali metal amine and of butylene, the latter resulting from the addition of hydrogen to the diolefinic hydrocarbon, said hydrogen being displaced from the alkyl amine by the alkali metal. The diolefinic hydrocarbon so introduced to catalyst forming zone 2 serves as a hydrogen acceptor thus promoting the formation of the alkali metal amine.

Catalyst forming zone 2 is also provided with stirring or other mixing means so as to effect intimate contact between the alkali metal, aliphatic amine and added diolefinic hydrocarbon. When substantially all of the metal is converted into the alkali metal amine, the reaction mixture is directed from catalyst forming zone 2 through line 5 to cooling zone 6 wherein said reaction mixture is cooled to a temperature of from about 25° to about 75° C., and the cooled material is then conducted from cooling zone 6 through line 7 to reaction zone 8 to which a vinyl ester is directed by way of line 9. If desired, an additional quantity of an aliphatic amine selected from the group consisting of a monoalkyl amine and a dialkyl amine is directed through line 10 to reaction zone 8. The amine added through line 10 may be the same as or different from that added through line 1 to zone 2. In reaction zone 8, the aliphatic amine and vinyl ester are condensed in the presence of the alkali metal amine catalyst formed as hereinbefore set forth and introduced to zone 8 by way of line 7.

The condensation of an aliphatic amine and a vinyl ester in zone 8 forms a product with the general formula

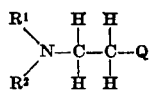

wherein $R^1$ represents a member of the group consisting of an alkyl group and a hydrogen atom, $R^2$ represents an alkyl group and Q represents the anion of an acid, particularly a hydrohalic acid or alkanoic acid.

From reaction zone 8, the resultant reaction mixture is directed through line 11, to separating zone 12, which may comprise a fractionator or other suitable separating equipment in which unconverted aliphatic amine is separated and from which said unconverted aliphatic amine is discharged through line 13 and recycled to reaction zone 8. The desired condensation product formed in the process which boils higher than the unconverted aliphatic amine is directed from separating zone 12 through line 14 to storage or to further use not illustrated in the diagrammatic drawing. Small amounts of organic compounds boiling higher than the desired condensation product and used catalyst contained therein may be discharged through line 15 to waste or to catalyst recovery treatment not illustrated in the diagrammatic drawing. Sometimes it is desirable to return a portion of the used catalyst to reaction zone 8 by means not illustrated in the drawing.

The following example is given to illustrate the process of this invention although it should not be construed to limit unduly the broad scope of the invention.

250 ml. of dibutylamine and 25 g. metallic sodium were heated to 130° C. with stirring in a 500 ml. 3 necked flask. The sodium was broken up into small shiny droplets, but there was no evidence of a reaction. A slow stream of butadiene was bubbled into the mixture at atmospheric pressure and immediately the amine solution turned dark red. Continued passage of the butadiene resulted in the conversion of 22 g. of sodium into the sodium salt of dibutylamine which was appreciably soluble in the unreacted amine at the reaction temperature. The reacted solution was decanted from the 3 g. of unreacted sodium metal, and on cooling the solution to room temperature a portion of the sodium salt of dibutylamine crystallized.

The saturated reddish brown solution was decanted, mixed with an equal volume of dibutylamine, and 86 g. (1 mole) vinyl acetate added to the mixture which was maintained at 50°–55° C. by external cooling with water for a period of 2 hours. By distillation of the reaction mixture, unreacted dibutylamine, unreacted vinyl acetate, and 108 g. of a condensation product boiling at 105° to 110° C. at 3 mm. pressure of mercury were recovered. The condensation product was obtained in 50 weight per cent of the theoretical yield based on the vinyl acetate charged and it had the following properties: $d^{20}{}_4=0.8980$; $n^{20}{}_D=1.4464$; boiling point=about 108° C. @ 3 mm. of mercury. Analysis found: per cent C 68.1, per cent H 11.3, per cent N 7.5.

The C, H and N analysis of the crude fraction boiling over a range of 5° C. corresponds closely with the theoretical composition of the compound

which is the product of the described reaction.

I claim as my invention:

1. A condensation process which comprises reacting an aliphatic amine selected from the group consisting of a monoalkyl amine and a dialkyl amine and minor proportions of an alkali metal and of a conjugated diolefin at a temperature above the melting point of said alkali metal for a time sufficient to form a reaction mixture containing an alkali metal amine and substantially free from unconverted alkali metal; cooling said reaction mixture to a temperature lower than the melting point of said alkali metal; and reacting the cooled reaction mixture with a vinyl ester of the formula $CH_2=CH-Q$ wherein Q represents the anion of an acid to form a condensation product of said aliphatic amine and vinyl ester.

2. A condensation process which comprises reacting an aliphatic amine selected from the group consisting of a monoalkyl amine and a dialkyl amine, and minor proportions of an alkali metal and a conjugated diolefin at a temperature above the melting point of said alkali metal for a time sufficient to form a reaction mixture containing an alkali metal amine and substantially free from unconverted alkali metal; cooling said reaction mixture to a temperature lower than the melting point of said alkali metal; and reacting the cooled reaction mixture with an aliphatic amine selected from the group consisting of a monoalkyl amine and a dialkyl amine and a vinyl ester with the formula $CH_2=CH-Q$ wherein Q represents the anion of an acid to form a condensation product.

3. A condensation process which comprises reacting an aliphatic amine selected from the group consisting of a monoalkyl amine and dialkyl amine, a minor proportion of an alkali metal, and a conjugated diolefin the latter in an amount of from 0.5 to about 2 molecular proportions per atomic proportion of alkali metal at a temperature above the melting point of said alkali metal for a time sufficient to form a reaction mixture containing an alkali metal amine and substantially free from elementary alkali metal; cooling said reaction mixture to a temperature lower than the melting point of said alkali metal; and admixing the cooled reaction mixture with a vinyl ester of the formula $CH_2=CH-Q$ wherein Q represents the anion of an acid to form a condensation product of said aliphatic amine and vinyl ester.

4. A condensation process which comprises reacting an aliphatic amine selected from the group consisting of a monoalkyl amine and a dialkyl amine, a minor proportion of an alkali metal, and a conjugated diolefin, the latter in an amount of from 0.5 to about 2 molecular proportions per atomic proportion of alkali metal at a temperature above the melting point of said alkali metal for a time sufficient to form a reaction mixture containing an alkali metal amine and substantially free from elementary alkali metal; cooling said reaction mixture to a temperature lower than the melting point of said alkali metal; and admixing the cooled reaction mixture with an additional quantity of said aliphatic amine and a vinyl ester of the formula $CH_2=CH-Q$ wherein Q represents the anion of an acid to form a condensation product of said aliphatic amine and vinyl ester.

5. The process defined in claim 3 further characterized in that said alkali metal comprises sodium.

6. The process defined in claim 3 further characterized in that said alkali metal comprises potassium.

7. The process defined in claim 4 further characterized in that said alkali metal comprises sodium.

8. The process defined in claim 4 further characterized in that said alkali metal comprises potassium.

9. A condensation process which comprises reacting two atomic proportions of an alkali metal, at least two molecular proportions of an aliphatic amine selected from the group consisting of a monoalkyl amine and a dialkyl amine, and one molecular proportion of a conjugated diolefin at a temperature higher than the melting point of said alkali metal to form a catalyst mixture comprising an alkali metal amine and a mono-olefin; cooling said catalyst mixture to a temperature of from about 0° to about the melting point of said alkali metal; and admixing the cooled catalyst mixture with an aliphatic amine selected from the group consisting of a monoalkyl amine and a dialkyl amine and a compound of the formula $CH_2=CH-Q$ wherein Q represents the anion of an acid.

10. A condensation process which comprises reacting two atomic proportions of sodium, at least two molecular proportions of an aliphatic amine selected from the group consisting of a monoalkyl amine and a dialkyl amine, and one molecular proportion of a conjugated diolefin at a temperature higher than the melting point of sodium to form a catalyst mixture comprising a sodium amine and a mono-olefin; cooling said catalyst mixture to a temperature of about 0° to about the melting point of sodium; and admixing the cooled catalyst mixture with an additional quantity of an aliphatic amine selected from the group consisting of a monoalkyl amine and a dialkyl amine and a compound of the formula $CH_2=CH-Q$ wherein Q represents the anion of an acid.

11. The process defined in claim 10 further characterized in that said aliphatic amine comprises a monoalkyl amine and said conjugated diolefin comprises 1,3-butadiene.

12. The process as defined in claim 10 further characterized in that said aliphatic amine comprises a dialkyl amine and said conjugated diolefin comprises 1,3-butadiene.

13. The process of claim 1 further characterized in that Q in said formula represents the anion of a mineral acid.

14. The process of claim 1 further characterized in that Q in said formula represents the anion of a carboxylic acid.

15. The process of claim 2 further characterized in that Q in said formula represents the anion of a mineral acid.

16. The process of claim 2 further characterized in that Q in said formula represents the anion of a carboxylic acid.

JOSEPH D. DANFORTH.

REFERENCES CITED

The following references are of record in the file of this patent:

FOREIGN PATENTS

| Number | Country | Date |
|--------|---------|------|
| 528,466 | Germany | July 1, 1931 |